United States Patent [19]

Kamikura et al.

[11] Patent Number: 4,734,632

[45] Date of Patent: Mar. 29, 1988

[54] DRIVING DEVICE FOR A STEPPING MOTOR

[75] Inventors: Shigeo Kamikura; Yasushi Ema, both of Kodaira, Japan

[73] Assignee: Silver Seiko Ltd., Japan

[21] Appl. No.: 912,057

[22] Filed: Sep. 26, 1986

[30] Foreign Application Priority Data

Oct. 17, 1985 [JP] Japan .................. 60-231791

[51] Int. Cl.$^4$ .............................................. G05B 19/40
[52] U.S. Cl. ...................................................... 318/685
[58] Field of Search ................................. 318/685, 696

[56] References Cited

U.S. PATENT DOCUMENTS 4,446,413  5/1984  Remur et al. ................... 318/696
4,480,218 10/1984  Hair .................................. 318/696

FOREIGN PATENT DOCUMENTS 59-181999 10/1984 Japan .

*Primary Examiner*—William M. Shoop, Jr.
*Assistant Examiner*—Saul M. Bergmann
*Attorney, Agent, or Firm*—Lorusso & Loud

[57] ABSTRACT

A driving device for a stepping motor wherein detection of a position of the rotor of a stepping motor can be effected accurately without the necessity of adjustments of various elements. The device detects a current flow in a field winding of an energized phase and compares it with a simulated saturation curve to detect a back EMF induced in the winding to find a current position of the rotor of the motor.

The simulated saturation curve is produced by energizing the winding with a low voltage, measuring current flows in the winding as voltage signals at three different points of time, and calculating several data indicating a saturation curve from the voltage signals. The data are stored in memory and recalled one after another to produce a corresponding voltage when the field winding is energized.

15 Claims, 15 Drawing Figures

FIG. 5

(a) Forward Rotation in One Phase Driving

|    | Phase4 | Phase3 | Phase2 | Phase1 | Data Table | Comparator Output |
|----|--------|--------|--------|--------|------------|-------------------|
| P1 | 0      | 0      | 0      | 1      | S1         | Com 1             |
| P2 | 0      | 0      | 1      | 0      | S2         | Com 2             |
| P3 | 0      | 1      | 0      | 0      | S3         | Com 3             |
| P4 | 1      | 0      | 0      | 0      | S4         | Com 4             |

(b) Reverse Rotation in One Phase Driving

|    | Phase4 | Phase3 | Phase2 | Phase1 | Data Table | Comparator Output |
|----|--------|--------|--------|--------|------------|-------------------|
| P1 | 0      | 0      | 0      | 1      | S1         | Com 1             |
| P2 | 1      | 0      | 0      | 0      | S4         | Com 4             |
| P3 | 0      | 1      | 0      | 0      | S3         | Com 3             |
| P4 | 0      | 0      | 1      | 0      | S2         | Com 2             |

(c) Forward Rotation in Two Phase Driving

|    | Phase4 | Phase3 | Phase2 | Phase1 | Data Table | Comparator Output |
|----|--------|--------|--------|--------|------------|-------------------|
| P1 | 0      | 0      | 1      | 1      | S2         | Com 2             |
| P2 | 0      | 1      | 1      | 0      | S3         | Com 3             |
| P3 | 1      | 1      | 0      | 0      | S4         | Com 4             |
| P4 | 1      | 0      | 0      | 1      | S1         | Com 1             |

(d) Reverse Rotation in Two Phase Driving

|    | Phase4 | Phase3 | Phase2 | Phase1 | Data Table | Comparator Output |
|----|--------|--------|--------|--------|------------|-------------------|
| P1 | 0      | 0      | 1      | 1      | S1         | Com 1             |
| P2 | 1      | 0      | 0      | 1      | S4         | Com 4             |
| P3 | 1      | 1      | 0      | 0      | S3         | Com 3             |
| P4 | 0      | 1      | 1      | 0      | S2         | Com 2             |

DRIVING DEVICE FOR A STEPPING MOTOR

BACKGROUND OF THE INVENTION

This invention relates to a driving device for a stepping motor, and more particularly to a driving device for a stepping motor which detects an electromotive force (hereinafter referred to as EMF) appearing upon driving of a stepping motor to effect closed-loop control of the stepping motor.

A driving device is already known wherein an EMF induced in a field winding of a stepping motor is detected to detect a position of a rotor in order to effect closed-loop control of the stepping motor in accordance therewith.

Conventionally, stepping motor driving devices of the type mentioned are disclosed, for example, in U.S. Pat. No. 4,282,471 (issued on Aug. 4, 1981) and Japanese laid-open patent No. 59-181999 (laid open on Oct. 16, 1984).

The stepping motor driving device disclosed in U.S. Pat. No. 4,282,471 detects a back EMF induced in a field winding of a non-excited phase by a mutual inductance with a field winding of an excited phase to detect a position of the rotor of a stepping motor.

Meanwhile, the stepping motor driving device disclosed in Japanese laid-open patent No. 59-181999 directly detects, by means of specifically provided sensing means, an EMF induced by a permanent magnet of a stepping motor to detect a position of the rotor of the stepping motor.

On the other hand, the present applicant has already proposed a driving device for a stepping motor which, taking into consideration that an electric current flowing through a field winding of an excited phase of a stepping motor contains a back EMF induced by a self inductance of the winding, detects an EMF induced in the field winding by a magnetic pole of a field magnet of the rotor to detect a position of the rotor of the stepping motor to control rotation of the stepping motor (refer to Japanese Patent Application No. 60-162810).

However, the stepping motor driving device described just above has a drawback that it is necessary to adjust the level and the time constant of a CR circuit because a saturation curve which is to be subtracted from a voltage corresponding to an electric current flowing through a field winding of an excited phase in order to detect a back EMF is produced from the CR circuit.

It has another problem that the circuit construction is complicated and adjustment of the gain and offset of an operational amplifier is necessary for each phase.

SUMMARY OF THE INVENTION

It is an object of the present invention to provide a driving device for a stepping motor which eliminates the necessity of various adjustments such as adjustment of the voltage level.

It is another object of the invention to provide a driving device for a stepping motor wherein a back EMF induced in a field winding can be detected with accuracy in current operating conditions.

According to the present invention, a driving device for a stepping motor comprises detecting means for detecting a voltage corresponding to an electric current flowing through field windings of individual phases of the stepping motor, storing means in which saturation curves of electric currents flowing through the field windings of the phases are stored, analog to digital converter means for converting a voltage detected by the detecting means into a digital value, comparing means for comparing the voltage value thus converted by the analog to digital converter means with a value of the saturation curves stored in the storing means, and driving signal developing means for developing a driving signal for a subsequent next step when a difference between the voltage value and the value of the saturated curves at the comparing means reaches a predetermined value.

Accordingly, a voltage corresponding to an electric current flowing through a field winding of each phase is detected and then compared with stored values of a saturation curve to detect the position of the rotor of a stepping motor to control outputting of a driving signal. Accordingly, the present invention presents several effects that the circuit construction is simplified and the necessity of adjustments between a gain and an offset for individual phases is eliminated and that a driving device for a stepping motor can be provided which eliminates the necessity of a CR circuit that has been used to produce a saturation curve in a conventional driving device.

BRIEF DESCRIPTION OF THE DRAWING

FIG. 5 shows driving signal data tables;

DESCRIPTION OF THE PREFERRED EMBODIMENTS

Figure 1:
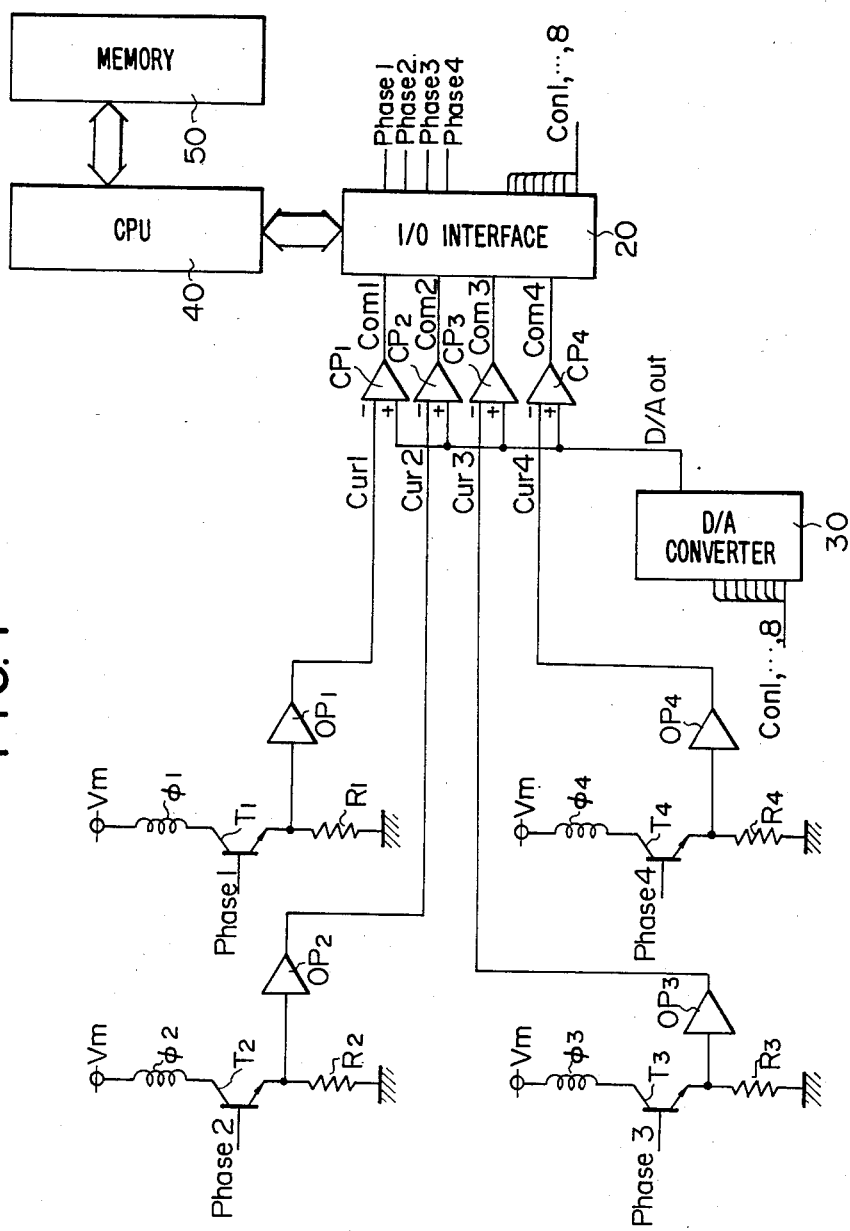
FIG. 1 is a circuit diagram of a driving device for a stepping motor showing an embodiment of the present invention.

Referring first to FIG. 1, a circuit diagram of a stepping motor driving device according to a first embodiment of the present invention is shown. In the stepping motor driving device of the present embodiment, an end of each of phase field windings $\phi_1$ to $\phi_4$ of a stepping motor is connected to a voltage supply line which supplies a driving voltage Vm and the other end is connected to the collector of a corresponding one of switching transistors $T_1$ to $T_4$ of the NPN type. The emitters of the switching transistors $T_1$ to $T_4$ are grounded via resistors $R_1$, $R_2$, $R_3$ and $R_4$ having relatively low resistances for detecting electric currents flowing through the windings of the motor and are connected to input terminals of operational amplifiers $OP_1$ to $OP_4$, respectively.

The operational amplifiers $OP_1$ to $OP_4$ are connected to inverting input terminals of comparators $CP_1$ to $CP_4$, respectively. Output terminals of the comparators $CP_1$ to $CP_4$ are connected to input ports of an input/output interface (hereinafter referred to as an I/O interface) 20 having 8 bit digital output ports which are connected to input terminals of a digital to analog converter (hereinafter referred to as a D/A converter) 30. An output terminal of the D/A converter 30 is connected to noninverting input terminals of the comparators $CP_1$ to $CP_4$. The comparators $CP_1$ to $CP_4$, the I/O interface 20, the D/A converter 30, CPU 40 and memory 50 (i.e., the saturation curve producing routines of FIGS. 3(a), (b) and (c)) constitute an analog to digital (A/D) converter of the successive comparison type which itself is well known in the art.

The I/O interface 20 is connected via a bus to a central processing unit (hereinafter referred to as a CPU) 40 which is in turn connected to a memory 50 including a read only memory (ROM) and a random access memory (RAM). Driving signals Phase1 to Phase4 for individual phases are delivered from the output ports of the I/O interface 20 to the bases of the transistors $T_1$ to $T_4$, respectively.

Now, operation of the stepping motor driving device of the present embodiment having such a construction as described above will be described. It is to be noted that following description of operation will proceed on the assumption that the stepping motor driving device of the embodiment is incorporated in a printer.

Figure 2:
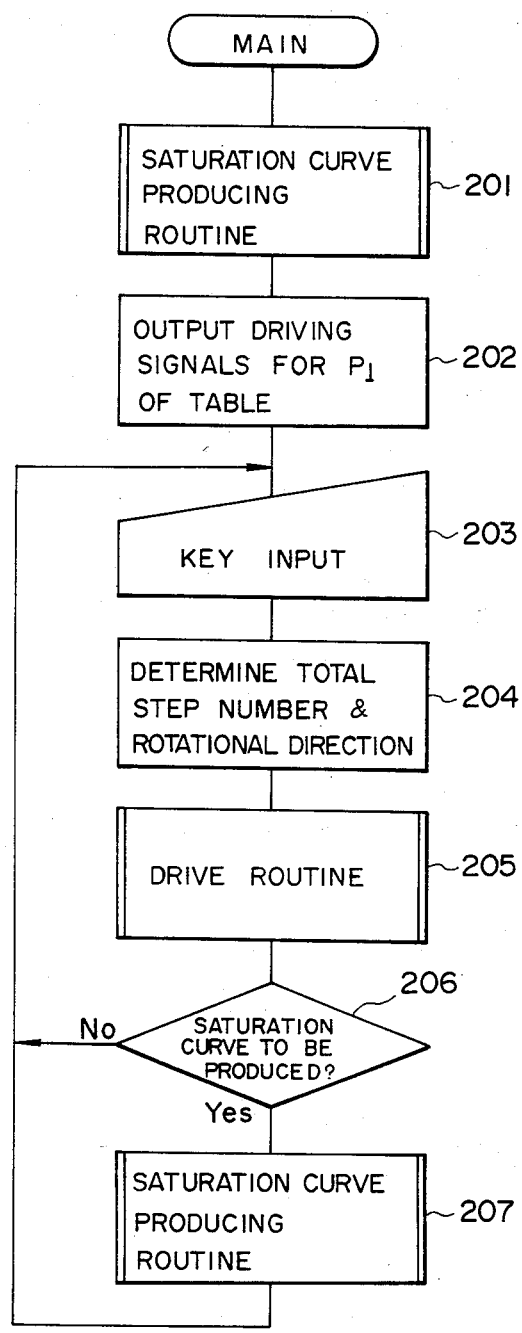
FIG. 2 is a flowchart showing a main routine for the stepping motor driving device shown in FIG. 1.
Figure 3A:
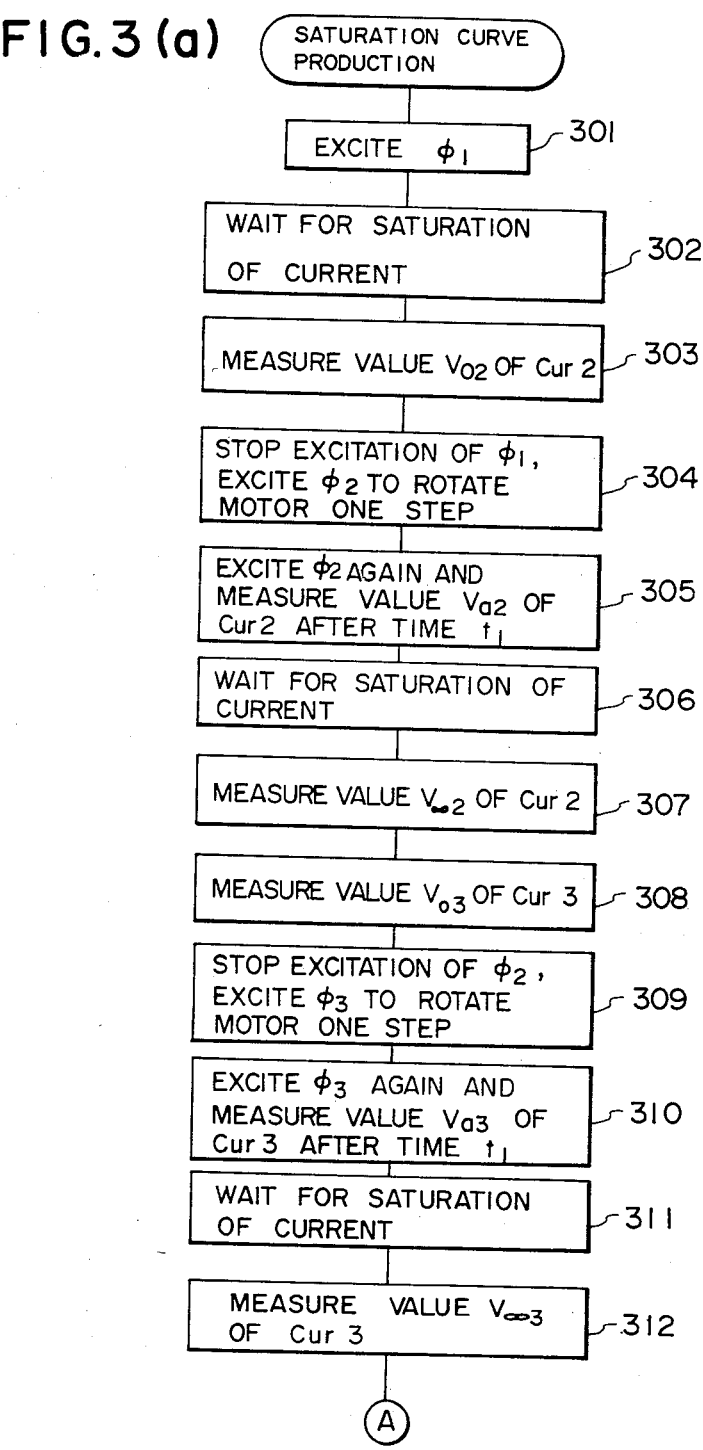
FIGS. 3(a) to 3(c) are flowcharts showing a saturation curve producing routine of the main routine of FIG. 2.
Figure 3:
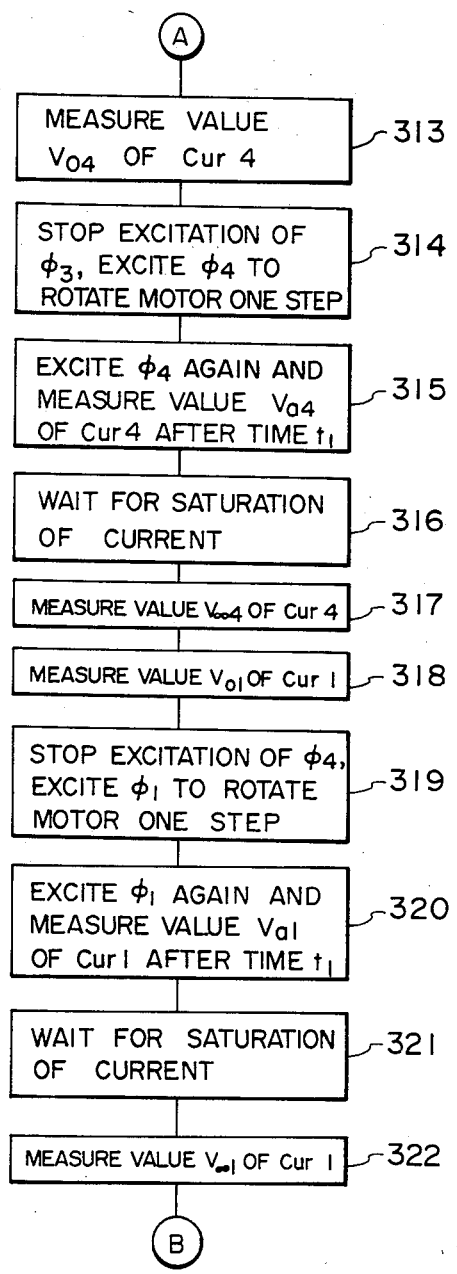
Figure 3C:
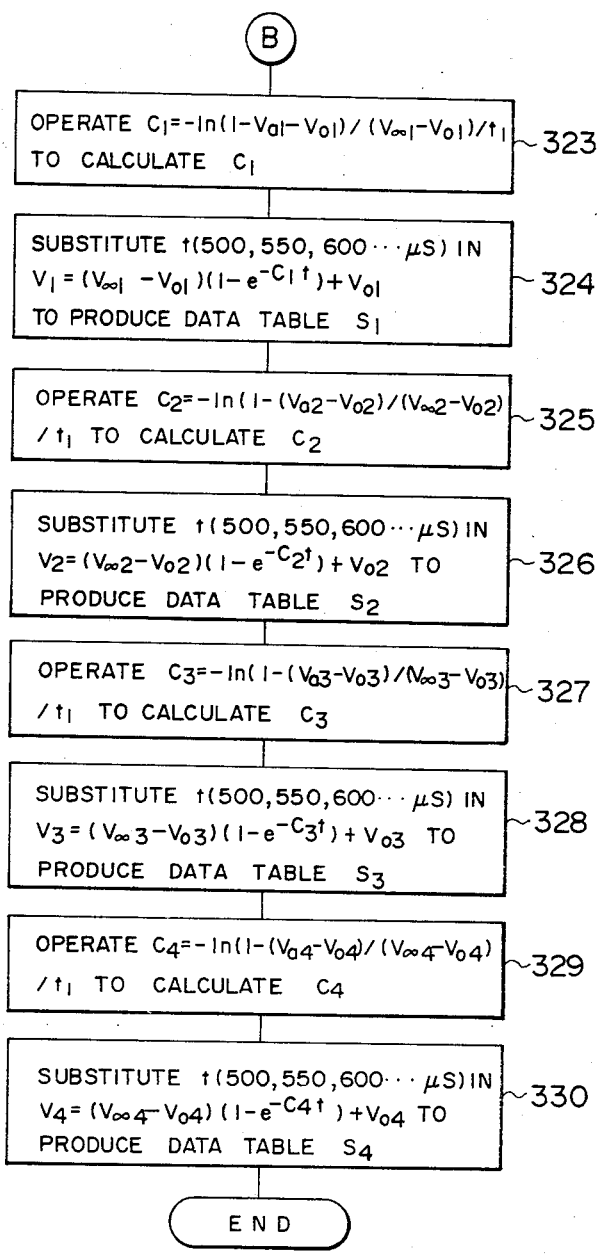

Referring first to FIG. 2 which shows the flowchart of a main routine, after turning on of the power to start the printer, the entire system is initialized mechanically and electrically, and then a subroutine for production of a saturation curve (FIGS. 3(a) to 3(c)) is executed at step 201.

Figure 6:
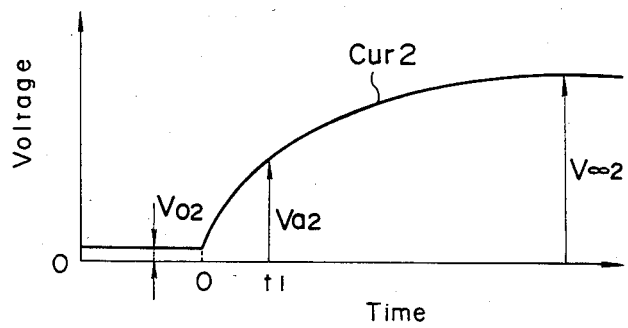
FIG. 6 is a diagram illustrating a saturation curve and measured values of the same.

In the saturation curve producing subroutine of FIGS. 3(a) to 3(c), at first at step 301, a driving signal Phase1 for the first phase is outputted from the I/O interface 20 to excite the field winding $\phi_1$. Thereafter, at step 302, a wait time, for example, of 100 microseconds or so is spent until the electric current becomes saturated, and then at step 303, an offset value $V_{o2}$ (refer to FIG. 6) of a saturation curve for the second phase, that is, an output Cur2 of the operational amplifier $OP_2$, is measured. Subsequently at step 304, the driving signal Phase1 for the first phase is stopped to turn off the excitation of the field winding $\phi_1$ while a driving signal Phase2 for the second phase is outputted to excite the field winding $\phi_2$ to rotate the motor one step. Then at step 305, after one step rotation of the motor, excitation of the field winding $\phi_2$ is stopped once, and then it is excited again (during this re-excitation, the measurement of step 303 may be executed instead) and an intermediate value $V_{a2}$ (refer to FIG. 6) of a saturation curve Cur2 is measured after lapse of an interval of time $t_1$ after starting the re-excitation of the field winding $\phi_2$. Thereafter at step 306, a wait time is spent until the electric current becomes saturated, and then at step 307, a saturation value $V_{\infty 2}$ of the saturation curve Cur2 is measured. Consequently, values at the three points including the offset value $V_{o2}$, the intermediate value $V_{a2}$ and the saturation value $V_{\infty 2}$ for determining the saturation curve Cur2 for the second phase therewith are measured.

After then, steps 308 to 312, 313 to 317 and 318 to 322 similar to the steps 303 to 307, respectively, are executed to determine saturation curves Cur3, Cur4 and Cur1 for the third, fourth and first phases, respectively, and thus values at the three points including offset values $V_{o3}$, $V_{o4}$ and $V_{o1}$, intermediate values $V_{a3}$, $V_{a4}$ and $V_{a1}$, and saturation values $V_{\infty 3}$, $V_{\infty 4}$ and $V_{\infty 1}$, are measured, respectively.

Subsequently, at step 323, a constant $C_1$ of the saturation curve Cur1 is calculated by a following equation $$C_1 = -\ln(1-(V_{a1}-V_{o1})/(V_{\infty 1}-V_{o1}))/t_1$$

Subsequently, at step 324, t=500, 550, 600, 650, ... ($\mu$s) are substituted after another in a following equation $$V_1 = (V_{\infty 1}-V_{o1})(1-e^{-C_1 t})+V_{o1}$$

to produce a data table $S_1$ for the saturation curve Cur1.

After then, steps 325 and 326, 327 and 328, and 329 and 330 similar to the steps 323 and 324, respectively, are executed to produce data tables $S_2$, $S_3$ and $S_4$ for the saturation curves Cur2, Cur3 and Cur4, respectively. After completion of production of the data tables $S_1$ to $S_4$, the saturation curve producing subroutine is ended and the process returns to the main routine of FIG. 2.

After returning to the main routine of FIG. 2, at step 202, driving signals Phase1 to Phase4 for instructing a driving state $P_1$ are outputted in accordance with one of driving signal data tables shown in FIGS. 5(a) to 5(d). For example, in the case of forward rotation in the one phase driving, a driving signal Phase1 is outputted as "1", and driving signals Phase2, Phase3 and Phase4 are outputted each as "0". This driving state is effected in order to reasonably determine the first driving state $P_1$.

Figure 4:
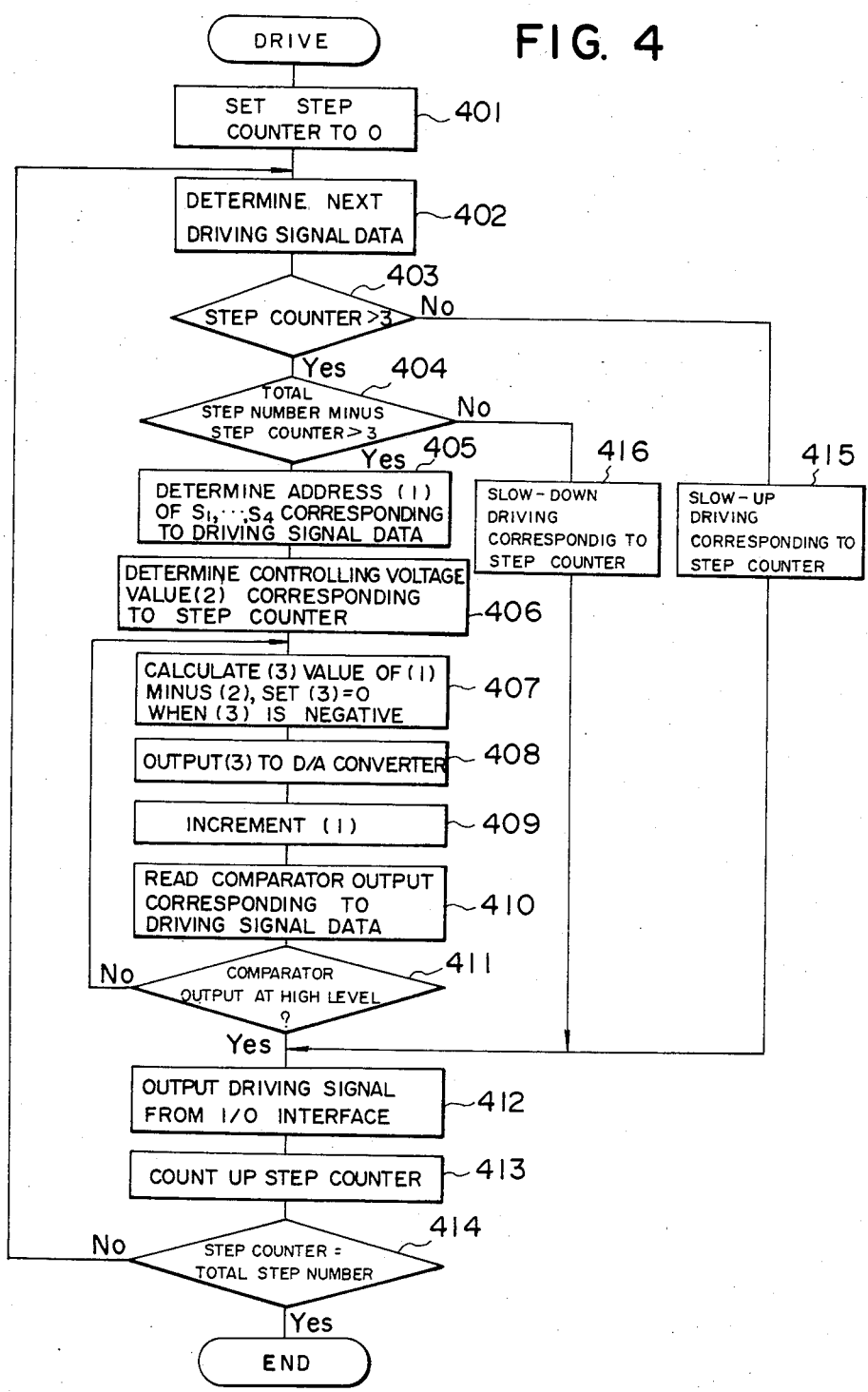
FIG. 4 is a flowchart showing a drive routine of the routine of FIG. 2.

Subsequently, at step 203, key input is waited for, and upon reception of a key input, a total step number and a rotational direction are determined at step 204 in accordance with the key input received, and then at step 205, a drive routine as illustrated in FIG. 4 is called. In this instance, parameters indicative of the total step number and the rotational direction are delivered as arguments to the drive routine which is executed subsequently.

After the drive routine as illustrated in FIG. 4 has been called from the main routine, at first at step 401, a step counter is set to "0". Then, at step 402, it is determined which one of the driving signal data tables of FIGS. 5(a) to 5(d) is to be used in accordance with the parameter indicating the rotational direction delivered from the main routine, and next driving signal data are determined now. It is to be noted that it is originally determined at the driving device whether the stepping motor is to be driven in one phase or in two phases.

Figure 8:
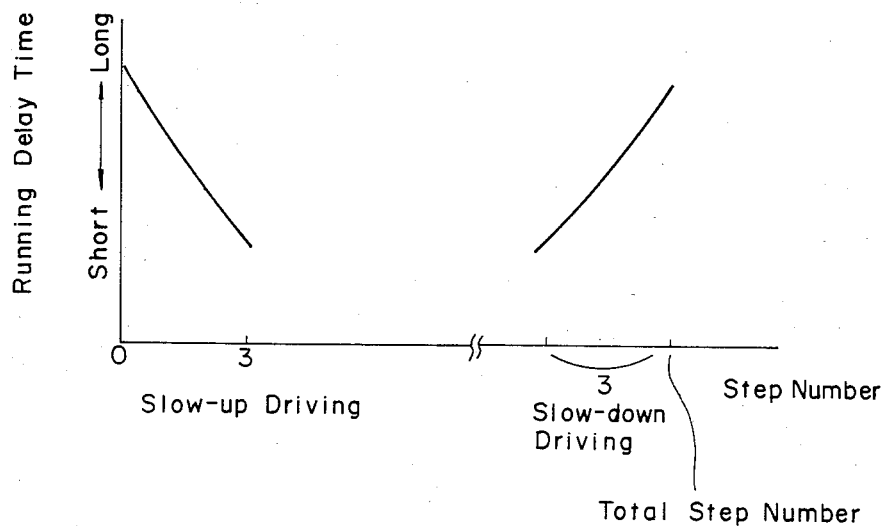
FIG. 8 is a diagram useful in explaining a slow-up drive and a slow-down drive.
Figure 9:
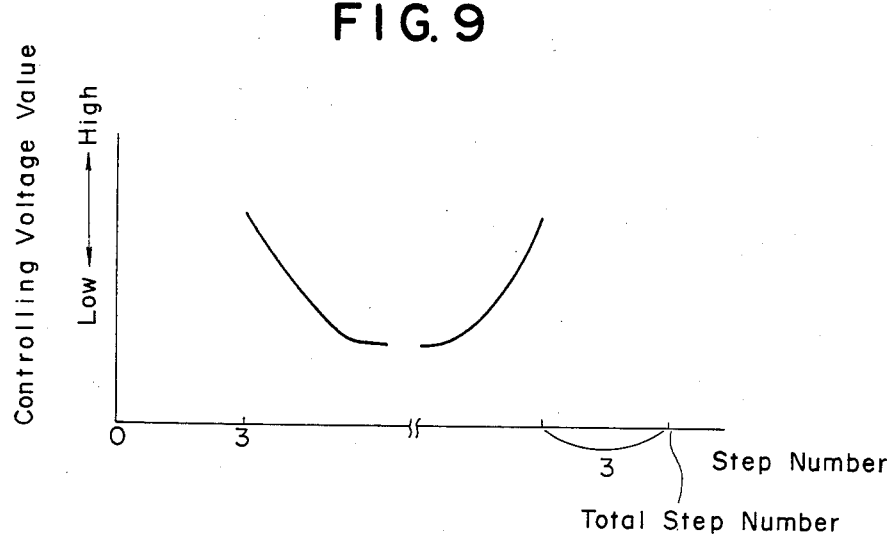
FIG. 9 is a diagram showing a relationship between a step number and a controlling voltage value.

Then, at step 403, it is judged whether or not the step counter has a value greater than 3. Since the step counter initially has a smaller value, the process goes to step 415 at which a delay time corresponding to a value of the step counter is spent in order to effect a slow-up driving. Such a delay time is picked up from a table which has been stored in advance in the memory 50 and contains delay times corresponding to step numbers. The smaller the value of the step counter, the longer the delay time, and the larger the value of the step counter, the shorter the delay time, as seen from FIG. 8. In the slow-up driving stage, the stepping motor is not yet under closed-loop control.

Subsequently, at step 412, the next driving signals Phase1 to Phase4 which have been determined at step 402 are outputted from the I/O interface 20. Accordingly, the rotor of the stepping motor is rotated one step in a preselected direction. Then at step 413, the step counter is counted up, and at step 414, it is judged whether or not the value of the step counter is equal to the total step number. When the value of the step counter is not equal to the total step number, the process returns to step 402.

Since the value of the step counter is initially considered not equal to the total step number, the process will naturally return to step 402, and at step 402, following driving signal data are determined, and then at step 403, judgment at step 402 is effected.

In case the judgment at step 403 has been passed more than three times and thus the slow-up driving has completed, subsequently at step 404, it is judged whether or not a difference between the total step number and the value of the step counter is greater than 3. Thus, if the difference between the total step number and the step counter is greater than 3 just when a state under closed-loop control is entered, then an address (1) of the selected one of the data tables $S_1$ to $S_4$ as shown in the driving signal data tables of Figs. 5(a) to 5(d) is determined in accordance with the driving signal data.

Figure 7:
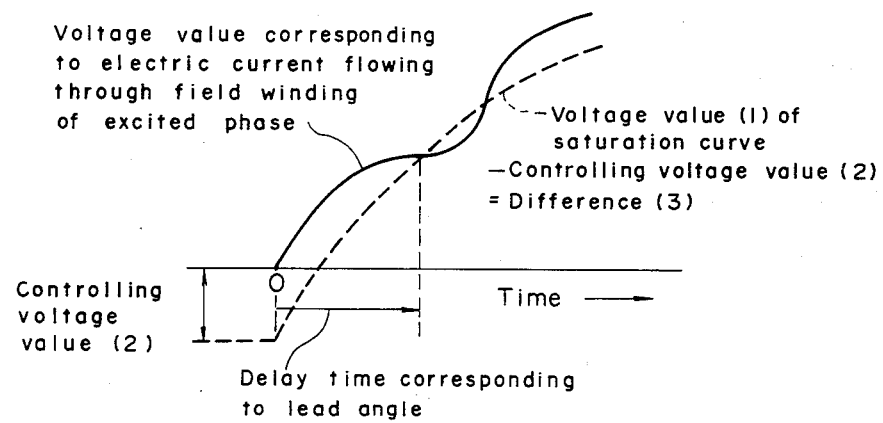
FIG. 7 is a diagram useful in explaining a control voltage value which is a difference between a voltage value correpsonding to a winding current and a saturation curve.

Then, at step 406, a control voltage (2) (refer to FIG. 7) is determined in accordance with the value of the step counter. The control voltage (2) is used to control the angle of lead of the rotor of the stepping motor, and changing of the control voltage (2) will change, as seen also from FIG. 7, the intersecting point between the voltage corresponding to the electric current flowing through the field winding of the excited phase and a voltage (3) obtained by subtracting the control voltage (2) from one of the saturation curves (voltage values) produced in the saturation curve producing routine (FIGS. 3(a) to 3(c)), thereby to change the delay time corresponding to the lead angle. It is to be noted that the control voltage (2) is picked up from a table which has been stored in advance in the memory 50 and contains control voltage values corresponding to individual step numbers, and the control voltage (2) is selected such that it is greater when the step number is nearer either to 3 or to the total step number minus 3, and it is smaller where the step number is an intermediate value.

Subsequently, at step 407, a difference (3) of the control voltage value (2) subtracted from a value (1) of the memory at the address (1) (a voltage of the saturation curve) is calculated (refer to FIG. 7), and if the difference (3) is a negative value, then the difference (3) is set to "0". After then, at step 408, the difference (3) is outputted as outputs Con1 to Con8 of the I/O interface 20 to the D/A converter 30 thereby to change the reference voltage $D/A_{OUT}$ which is to be applied to non-inverting input terminals of the comparators $CP_1$ to $CP_4$. Then, at step 409, the address (1) is incremented. This corresponds to a little increase of the value of the stored saturation curve in a direction toward saturation. Subsequently, at step 410, comparator outputs Com1 to Com4 corresponding to driving signal data as shown in the driving signal data tables if FIGS. 5(a) to 5(d) are read, and then at step 411, it is judged whether the comparator output Com1 to Com4 are at a high level. In case the comparator outputs Com1 to Com4 are not at a high level, this means that the output voltages $OP_1$ to $OP_4$ from the operational amplifier are lower than the reference voltage $D/A_{OUT}$, and consequently the process returns to step 407 in order to repeat the steps 407 to 411 until one of the comparator outputs Com1 to Com4 presents a high level. If one of the comparator outputs Com1 to Com4 presents a high level, then at step 412, the driving signals Phase1 to Phase4 are outputted from the I/O interface 20. In this manner, by detecting whether the comparator outputs Com1 to Com4 are at a high level or not, the position of the rotor corresponding to the lead angle is detected to determine the timing at which driving signals Phase1 to Phase4 for a subsequent next step are to be outputted. By outputting the driving signals Phase1 to Phase4, the stepping motor is driven to the next step.

Then at step 413, the step counter is counted up, and at step 414, it is judged whether or not the value of the step counter is equal to the total step number, and in case the former is not equal to the latter, the process returns to step 402. If the closed-loop control is proceeding and besides the value of the step counter is not yet equal to the total step number, the process returns to step 402 in order to repeat the processing of the steps 402 to 414 for closed-loop controlling the stepping motor.

When the value of the step counter approaches the total step number until a difference between them becomes 3 or less, the judgment at step 404 now becomes "no", and now the process advances to step 416. Now, a delay time correpsonding to the value of the step counter is spent in order to allow a slow-down driving corresponding to the value of the step counter. The delay time is picked up from a table which has been stored in advance in the memory 50 and contains delay time values corresponding to the total step numbers subtracted by values of the step counter, and the smaller the value of the step counter, the shorter the delay time, and the longer the value of the step counter, the longer the delay time, as seen from FIG. 8. In the slow-down driving stage, the stepping motor is no more under closed-loop control.

Subsequently, at step 412, the next driving signals which have been determined at step 402 are outputted from the I/O interface 20, and then at step 413, the step counter is counted up for the subsequent judgment at step 414.

In case the value of the step counter is equal to the total step number by the judgment at step 414, in order to end the driving of the stepping motor, the judgment at step 414 is passed through with "yes" to end the processing of the drive routine, and the process returns to the main routine of FIG. 2.

In the main routine of FIG. 2, subsequently it is judged at step 206 whether a saturation curve is to be produced or not, and in case a saturation curve is not to be produced, the process returns to step 203 to wait for a subsequent key input. On the contrary, in case it is judged at step 206 that a saturation curve is to be produced, for example, for loading of type paper, the saturation curve producing routine is executed at the following step 207 wherein data tables $S_1$ to $S_4$ for saturation curves are renewed or produced again, and then the process returns to step 203. The reason why the saturation curve producing routine is executed again at step 207 is that it is intended to suitably renew the data tables S₁ to S₄ and always use data of most appropriate saturation curves because the saturation curves vary due to a temperature rise by use of the stepping motor or by any other reason. Accordingly, the saturation curve producing routine is preferably executed after lapse of a suitable interval of time, and in the case of a typewriter or printer, each time print paper is loaded. In case a key input is received at step 203, naturally the processing including the step 204 is repeated.

Figure 10:
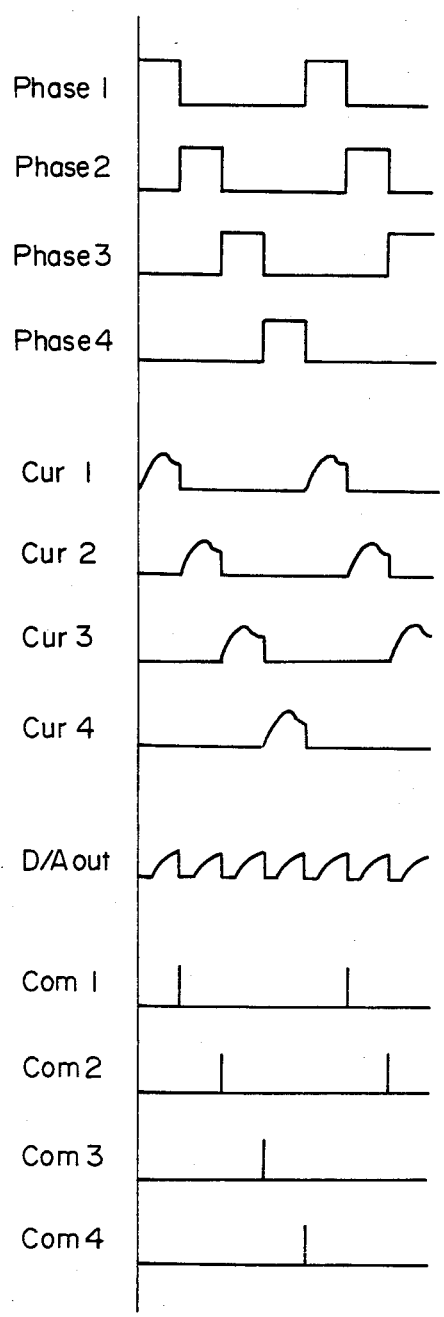
FIG. 10 is a time chart showing waveforms of various signals when the stepping motor driving device of FIG. 1 operates to forwardly rotate a stepping motor in the one phase driving.
Figure 11:
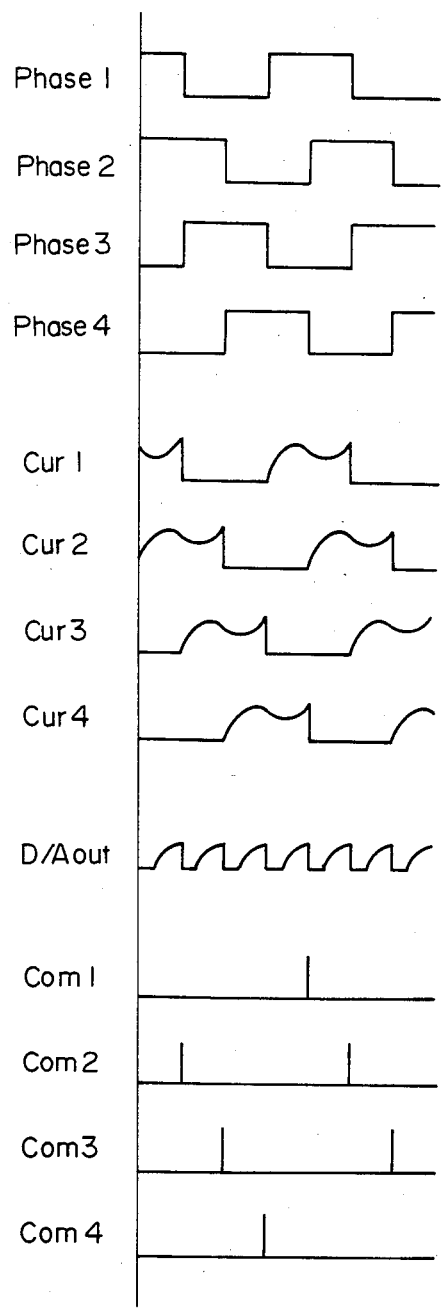
FIG. 11 is a time chart showing waveforms of various signals when the stepping motor driving device of FIG. 1 operates to forwardly rotate a stepping motor in the two phase driving.

Waveforms of various signals in the stepping motor driving device of the present embodiment are shown in FIGS. 10 and 11. FIG. 10 shows signal waveforms in the case of forward rotation in the one phase driving (corresponding to FIG. 5(a)) while FIG. 11 shows signal waveforms in the case of forward rotation in the two phase driving (corresponding to FIG. 5(c)).

Figure 12:
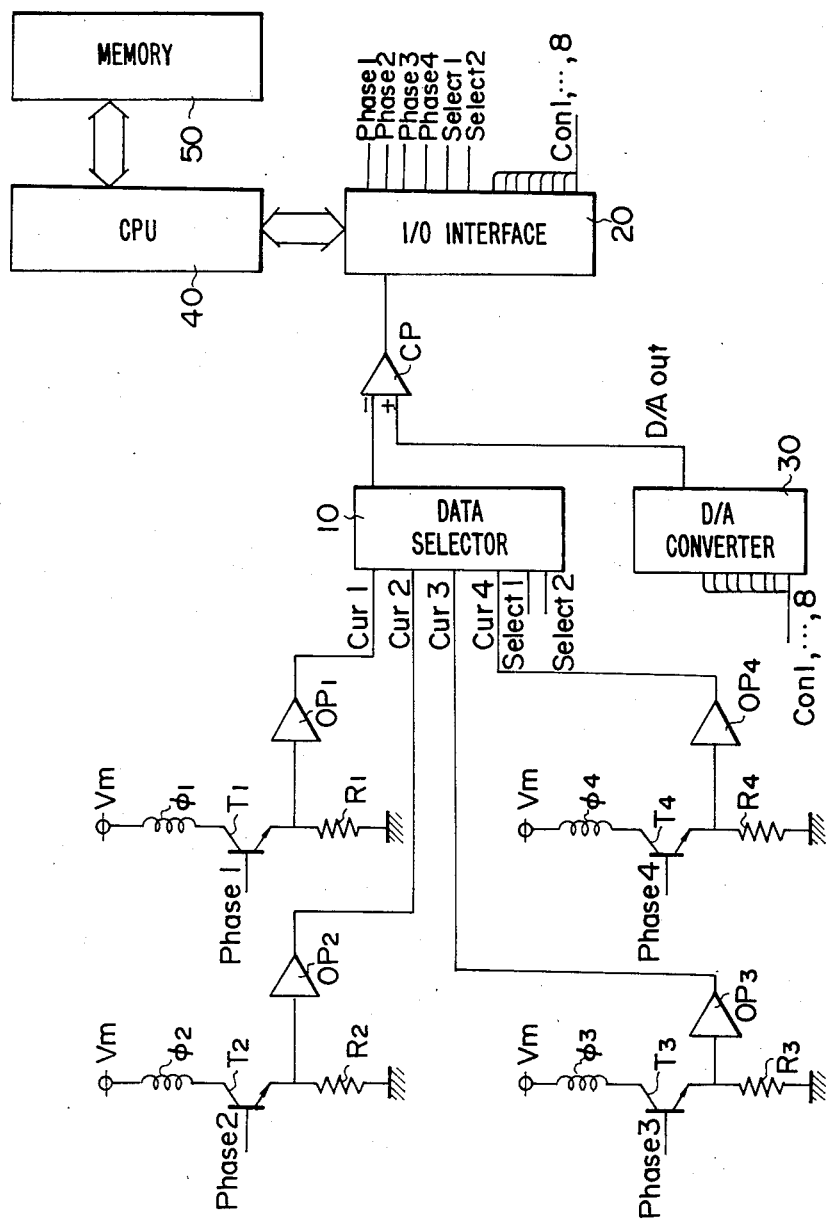
FIG. 12 is a circuit diagram of a driving device for a stepping motor showing another embodiment of the present invention.

FIG. 12 shows a driving device for a stepping motor according to a second embodiment of the present invention. The stepping motor driving device includes a single comparator CP in combination with a data selector 10 while the driving device shown in FIG. 1 includes the four comparators CP₁ to CP₄ having the output terminals thereof connected to the input ports of the I/O interface 20. In particular, output terminals of operational amplifiers OP₁ to OP₄ are connected to input terminals of the data selector 10 having an output terminal which is connected to an input port of an I/O interface 20. Selection signals Select1 and Select2 are outputted from output ports of the I/O port 20 and are received by selection signal terminals of the data selector 10. The selection signals Select1 and Select2 are used to selectively output one of outputs Cur1 to Cur4 of the operational amplifiers OP₁ to OP₄. Output of a D/A converter 30 is coupled only to a non-inverting input terminal of the comparator CP. Other constructions which have not been specifically mentioned just above are quite same with the stepping motor driving device according to the first embodiment as shown in FIG. 1, and hence detailed description will be omitted herein.

Operation of the stepping motor driving device of the present invention is substantially similar to that of the driving device of the first embodiment shown in FIG. 1 and is only different in that it is necessary to effect determination and outputting of selection signals Select1 and Select2 simultaneously with determination and outputting of driving signals (refer to steps 402 and 412, respectively) in the flowchart of the drive routine shown in FIG. 4. Accordingly, operation of the stepping motor driving device of the present embodiment can be readily inferred from the description of operation of the driving device of the embodiment shown in FIG. 1, and hence detailed description thereof will be omitted herein.

Figure 13:
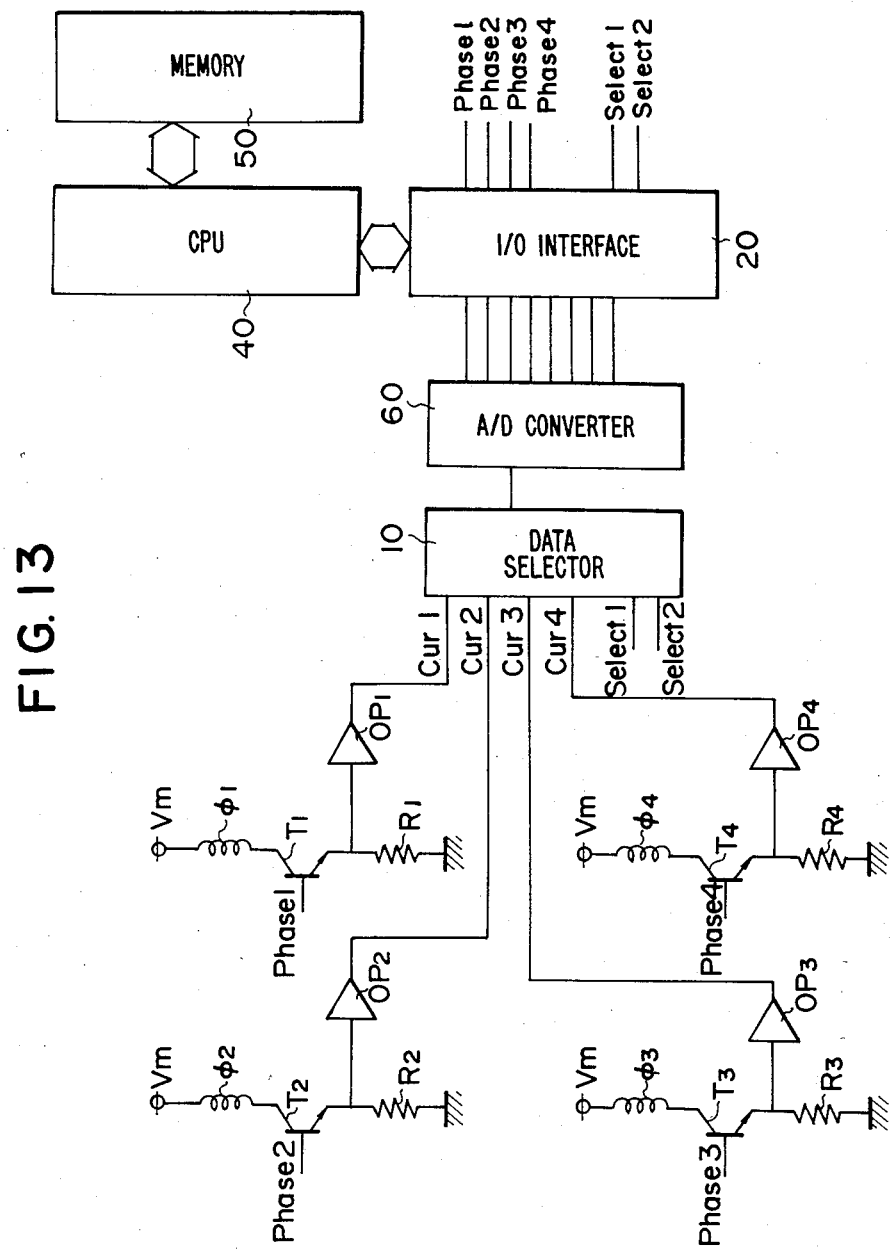
FIG. 13 is a circuit diagram of a driving device for a stepping motor showing a further embodiment of the invention.

FIG. 13 shows a third embodiment of the present invention. A driving device for a stepping motor of the present embodiment is only different from the stepping motor driving device of the second embodiment shown in FIG. 12 in that it includes an ordinary A/D converter 60 while the driving device of the second embodiment employs an A/D converter of the successive comparison type. In particular, an output of a data selector 10 is connected to an input terminal of the A/D converter 60 which has 8 bit output terminals connected to input ports of an I/O interface 20. Other constructions which have not been specifically mentioned just above are quite similar to those of the driving device of the second embodiment.

Operation of the stepping motor driving device of the present invention is also substantially similar to that of the driving device of the second embodiment shown in FIG. 12, and hence detailed description thereof will be omitted herein.

It is to be noted here that while in the embodiments described above the stepping motor driving device is described as incorporated in a printer, the driving device of the present invention can naturally be incorporated in any other apparatus than a printer.

Further, while in the embodiments the controlling voltage value (2) is determined in accordance with the step number, it can be determined in accordance with the velocity of a stepping motor.

What is claimed is:

1. A driving device for a stepping motor, comprising:
    detecting means for detecting a voltage corresponding to an electric current flowing through field windings of individual phases of said stepping motor;
    storing means in which saturation curves of electric currents flowing through said field windings of said phases are stored;
    comparing means for comparing the voltage value detected by said detecting means with a value of the saturation curves stored in said storing means; and
    driving signal developing means for developing a driving signal for a subsequent next step when a difference between the voltage value and the value of the saturated curves at said comparing means reaches a predetermined value.

2. A driving device according to claim 1, wherein said detecting means includes a resistor of a low resistance connected in series to each of the field windings of the motor.

3. A driving device according to claim 1, which includes means for successively developing values in accordance with one of the saturation curves for a particular one of the field wingings of the motor, a digital to analog converter for converting the successively developed values into a corresponding voltage, and wherein said comparing means compares the voltage detected by said detecting means for the particular field winding with the voltage from said digital to analog converter.

4. A driving device according to claim 3, wherein said detecting means includes a plurality of resistors of a low resistance connected in series to the field windings of the motor, and said comparing means includes a plurality of comparators each connected to one of said resistors and to said digital to analog converter.

5. A driving device according to claim 3, wherein said detecting means includes a plurality of resistors of a low resistance connected in series to the field windings of the motor, and said comparing means includes a data selector connector to said resistors for selectively developing a voltage detected by a particular one of said resistors, and a comparator connected to compare the voltage developed from said data selector with said detecting means with the voltage from said digital to analog converter.

6. A driving device according to claim 1, further comprising means for receiving a total step value indicative of a total number of steps for the motor to rotate, means containing a present step value indicative of a present number of steps the motor has rotated, and means responsive to the present number and/or the total number of steps for causing said driving signal developing means to produce a driving signal independent of the difference between the voltage value and the value of the saturated curves for a first and/or a last particular number of steps during rotation of the step motor for the total number of steps.

7. A driving device according to claim 6, wherein said particular number of steps is 3 or a value around 3.

8. A driving device according to claim 1, further comprising saturation curve producing means for producing a saturation curve for each of the field windings of the motor and for storing several data of the saturation curve produced into said storing means.

9. A driving device according to claim 1, further comprising saturation curve producing means for producing saturation curves for the field windings of the motor and for storing several data of the saturation curves produced into said storing means.

10. A driving device according to claim 9, wherein said saturation curve producing means is operable each time the motor is to be rotated from one to another angular position.

11. A driving device according to claim 9, wherein said saturation curve producing means includes means for energizing one of the field windings of the motor with a predetermined voltage, means for measuring voltages at first, second and third points of time before and after starting energization of the field winding before and after saturation is reached, respectively, and means for calculating several values of said saturation curve from the voltages at the first, second and third points of time.

12. A simulating device for producing a simulated saturation curve for a field winding of a stepping motor, comprising means for detecting a current flow in the field winding as a voltage signal, means for energizing the field winding with a first predetermined voltage insufficient for the motor to rotate, means for taking voltage signals from said means for detecting at different points of time before and after starting energization of the field winding, means for calculating several values of said saturation curve from the voltage signals at the different points of time, means for storing the calculated values therein, means for successively recalling the stored values when the field winding is energized with a second predetermined voltage to rotate the motor, and means responsive to each of the recalled values for producing a voltage corresponding to the values.

13. A simulating device according to claim 12, wherein said means for detecting is a resistor of a low resistance connected in series to the field winding.

14. A simulating device according to claim 12, wherein the different points of time after energization of the field winding with the first predetermined voltage include first and second points of time before and after saturation is reached, respectively.

15. A driving device according to claim 10, wherein said saturation curve producing means includes means for energizing one of the field windings of the motor with a predetermined voltage, means for measuring voltages at first, second and third points of time before and after starting energization of the field winding before and after saturation is reached, respectively, and means for calculating several values of a saturation curve from the voltages at the first, second and third points of time.

* * * * *

UNITED STATES PATENT AND TRADEMARK OFFICE
CERTIFICATE OF CORRECTION

PATENT NO. : 4,734,632

DATED : March 29, 1988

INVENTOR(S) : KAMIKURA et al

It is certified that error appears in the above-identified patent and that said Letters Patent is hereby corrected as shown below:

Col. 2, line 43, "correpsonding" should read --corresponding--.

Col. 5, line 56, after "voltage" insert --value--.

Col. 6, line 3, "output" should read --outputs--;

line 35, "correpsonding" should read --corresponding--.

Col. 8, line 59, "connector" should read --connected--.

Signed and Sealed this

Seventh Day of February, 1989

*Attest:*

DONALD J. QUIGG

*Attesting Officer*  *Commissioner of Patents and Trademarks*